United States Patent [19]
Stommes et al.

[11] Patent Number: 5,223,822
[45] Date of Patent: Jun. 29, 1993

[54] VALVE POSITION INDICATOR

[75] Inventors: Wallace F. Stommes; Gerald J. Nelson, both of Fergus Falls; Gerald A. Cuhel, Richville; Ross S. Kunz, Callaway, all of Minn.

[73] Assignee: Stonel Corporation, Fergus Falls, Minn.

[21] Appl. No.: 874,073

[22] Filed: Apr. 24, 1992

[51] Int. Cl.$^5$ .......................... G08B 7/06; G08B 21/00
[52] U.S. Cl. .................................... 340/686; 116/277; 137/551; 137/556; 200/336; 200/574; 340/691
[58] Field of Search ............... 340/686, 691; 116/277, 116/4, DIG. 21; 200/336, 574, 568, 31 R; 137/556, 554, 553, 551

[56] References Cited

U.S. PATENT DOCUMENTS

| | | | |
|---|---|---|---|
| 2,485,942 | 10/1949 | Turner | 116/277 |
| 2,829,538 | 4/1958 | Mueller | 74/548 |
| 3,148,701 | 9/1964 | Bagwell | 137/556 |
| 3,238,916 | 3/1966 | Hale | 116/301 |
| 3,238,968 | 3/1966 | Pecis | 137/556 |
| 3,585,808 | 6/1971 | Huffman | 62/93 |
| 3,604,445 | 9/1971 | Jordan | 137/113 |
| 3,643,620 | 2/1972 | Penny | 116/269 |

(List continued on next page.)

FOREIGN PATENT DOCUMENTS

| | | |
|---|---|---|
| 43335 | 8/1910 | Austria . |
| 045127 | 2/1982 | European Pat. Off. . |
| 092714 | 11/1983 | European Pat. Off. . |
| 3120171 | 1/1983 | Fed. Rep. of Germany . |
| 520297 | 4/1992 | Switzerland . |

OTHER PUBLICATIONS

Brochure: Quartz TM Design.
Brochure: Valve Position Indication.
Brochure: Automax, Inc. Ultraswitch TM and Transmitter.
Brochure: Automax, Inc. Ultraswitch TM and Transmitter.
Brochure: Norgren Pneumatic Control Accessories.
Brochure: PMV Rotary Positioner (Stockholm, Sweden).
Blue Prints–Cashco Inc. (4 pages).
Brochure: Ranger ZCT TM Rotary Control Valve (Cashco Inc.).
PMV Stellungsregler Model P-1700 und P-1720.
Brochure: PMV Stellungsragler Model P-1600 un P-1620.
Brochure: PMV Stellungsragler Model P-1500 un P-1520.

*Primary Examiner*—Glen R. Swann, III
*Attorney, Agent, or Firm*—Haugen and Nikolai

[57] ABSTRACT

An actuator shaft is journaled for rotation within a housing of the apparatus and is coupled to a rotary shaft projecting through the top of a valve or valve actuator. The actuator shaft is coupled to a drum having graphics information on an outer surface thereof, such as the words "open" and "closed". As the actuator shaft rotates the graphics information is also rotated past a window in a window member such that the words observed indicate the position of the valve. The window member couples to an alignment ring which is keyed to receive the window member. By rotating the alignment ring, the window member can be selectively oriented such that the graphics are viewable from a preferred perspective. Each of the components is keyed to be oriented with one another and constrained as a cartridge assembly which can be quickly removed as a single unit to access internal switches and circuitry, whereby the cartridge can be quickly reattached such that the components cannot be inadvertently incorrectly reassembled. An electronic display provides a visual signal indicative of the rotary shaft position and cooperating with the viewable indicia, and further, provides a visual error signal when the valve is in an abnormal position. The apparatus also contains processing means for intelligently controlling internally located control elements, such as solenoids, in response to sensed parameters of the sensed valve.

38 Claims, 6 Drawing Sheets

U.S. PATENT DOCUMENTS

| | | | |
|---|---|---|---|
| 3,867,289 | 2/1975 | Ortega | 210/95 |
| 3,910,308 | 10/1975 | Mack | 137/553 |
| 3,937,077 | 2/1976 | Klamm | 73/146.8 |
| 3,981,266 | 9/1976 | Persson | 116/290 |
| 4,029,043 | 6/1977 | Nothdurft | 116/277 |
| 4,059,823 | 11/1977 | Martin et al. | 340/442 |
| 4,072,126 | 2/1978 | Kemp | 116/277 |
| 4,116,157 | 9/1978 | Evans | 116/271 |
| 4,137,942 | 2/1979 | Hargraves et al. | 137/557 |
| 4,153,003 | 5/1979 | Willis | 116/268 |
| 4,188,974 | 2/1980 | Roger | 137/557 |
| 4,194,529 | 3/1980 | Hargraves et al. | 137/557 |
| 4,196,730 | 4/1980 | Wilson | 604/155 |
| 4,203,385 | 5/1980 | Mayer et al. | 116/270 |
| 4,214,133 | 7/1980 | Wolford et al. | 200/31 R |
| 4,252,146 | 2/1981 | Roger | 137/458 |
| 4,256,141 | 3/1981 | Peters | 137/557 |
| 4,287,907 | 9/1981 | Worthy | 137/255 |
| 4,327,768 | 5/1982 | Behle | 137/553 |
| 4,494,566 | 1/1985 | Sinclair et al. | 137/556 |
| 4,962,290 | 10/1990 | Nelson et al. | 200/308 |
| 4,994,792 | 2/1991 | Ziegler, Jr. | 340/691 |
| 5,039,918 | 8/1991 | Kronberg | 340/691 |

VALVE POSITION INDICATOR

BACKGROUND OF THE INVENTION

1. Field of the Invention

The present invention relates generally to an apparatus for providing signals indicative of the rotation position of a rotary shaft, such as the shaft on a control valve, and more particularly to an improved rotary shaft position indicating mechanism incorporating a visual display of the shaft position and having self-centering parts.

2. Discussion of the Prior Art

U.S. Pat. No. 4,962,290 which is assigned to the present applicant discloses a rotary shaft position indicating switch assembly adapted to be mounted on a valve or a pneumatic valve actuator having a rotary shaft projecting therefrom. The assembly includes a frusto-conical member which is selectively secured to the underside of the base by a set screw, and which is downwardly and outwardly flared. A rotatable second frusto-conical member is concentrically disposed within the confines of the first frusto-conical member and includes graphics information thereon viewable through a window area.

Automax, Inc. of Cincinnati, Ohio manufactures and sells a rotary shaft position indicator in which a cam shaft passes through the base portion thereof and is journaled for rotation therein. A shaft passes upward through the housing cover and into a plastic dome having an inner member containing printed graphics information secured to the cam shaft. The outer member of the dome is generally opaque except for a transparent window through which the graphics information can be read.

The Automax device includes only a single window through which the graphics information can be observed and thus is only viewable when the observer is positioned in the limited zone. Further, the dome can only be removed by using a tool such as a screwdriver to facilitate access to the internal cams and switches. Thus, the dome has to be visually and carefully oriented every time it is snapped back onto the cover. This requires the operator to pay careful attention to what percentage of the "open" or "closed" indicia should be observable through the window when the dome is eventually reassembled to the cover. Thus, a careless operator or serviceman could inadvertently reassemble the graphics information of the dome at an orientation 90 degrees from the intended position, thus indicating an inaccurate valve position.

Another company, Proximity Controls, Inc., of Fergus Falls, Minnesota, manufactures and sells a line of valve position indicators including a mechanical display. In the Proximity Controls, Inc.'s devices, the visual indicator is mounted to the switch enclosure at a location between the valve being monitored and the switches. The indicator is made of two plastic drums, one inside the other, where the inner drum includes words, symbols or other graphics which may be viewed through a window formed in the outer drum. However, this indicator suffers from the drawback that the visual indicator is physically located between the valve being monitored and the switches and thus, is not observable from a position 360 degrees around the indicator. Moreover, the entire switch enclosure needs to be removed from the valve being monitored to make adjustments to the indicator. Finally, there is only one window designed in this indicator and there is no teaching that the window can be rotated such that it can be viewed from more than one perspective.

The design of the Proximity Controls rotary shaft position indicator suffers from the draw back that the visual indicator is viewable from only one perspective. Further, each window must be carefully aligned each time the respective window drums are reassembled to the housing, which is time consuming and prone to alignment errors. Both indicators require the user to use a separate tool to disassemble the indicator which can be both frustrating and clumsy. Finally, neither of the devices includes an electronic display.

Westlock Control Corporation of Moonachie, N.J., also manufactures and sells a line of valve position indicators as disclosed in U.S. Pat. No. 4,494,566. The device includes an inner drum having colored sections coordinating with the colored housing. This patent teaches only a mechanical display arrangement, and fails to teach any keying arrangement or an electrical display, or any color coordination with an electrical display.

Valve Conversions Limited of the United Kingdom is the owner of patent GB 2,229,254 which is similar to the Westlock device. It teaches various mechanical arrangements for color coordinating an inner drum with a housing. Again, this device fails to teach a keying arrangement, and also fails to teach an electronic display.

OBJECTS

It is accordingly a principle object of the present invention to provide an improved rotary shaft position indicating display apparatus.

A yet further object of the present invention is to provide a rotary shaft indicator wherein the indicator ca be quickly disassembled to provide access to internal switches defined along a shaft defined therein, wherein a drum having the graphics information and a drum defining a window are both keyed such that each can be quickly reassembled without paying particular attention to their correct orientation.

Yet another object of the present invention is to provide a rotary shaft indicator having a display device which can be readily adjusted in the field such that the graphics information can be viewed from any desirable prospective 360 degrees around the indicator, and above the indicator.

Another object of the present invention is to provide a rotary shaft position indicator and display that is easy to install in the field.

A yet further object of the present invention is to provide a rotary shaft indicator having more than one viewing window and corresponding graphics information viewable therethrough.

A yet further object of the present invention is to provide a rotary shaft indicator which can be readily adjusted in the field to allow adaption to a wide variety of devices embodying shafts whose position is to be monitored.

A yet further object of the present invention is to provide a cam which can be precisely positioned about an actuator shaft such that a corresponding sensor is responsive to the cam when the actuator shaft is in a precise radial position.

A yet further object of the present invention is to provide a rotary shaft indicator having an electronic display coordinated with the mechanical display both indicative of the valve position. Further, the electronic display can be functional standing alone without the mechanical display to provide a totally electronic indicator assembly.

A yet further object of the present invention is to provide a rotary shaft indicator having a cartridge comprising a window drum, a display drum, and a wire shield such that they are removable as a unit to access internal switches thus simplifying the disassembly/assembly procedure, wherein the display drum does not rotate with respect to the window drum when the cartridge is removed from the actuator shaft.

SUMMARY OF THE INVENTION

The foregoing features and objects are achieved by providing a rotary shaft position indicating and display apparatus having an alignment ring positioned within a chamber of a housing for orienting a position of a window member which is visible through the cover. The window member is keyed to the alignment ring such that the window member can be removed to access and adjust internal switches, and where the window member can be quickly reassembled to the housing in a correct orientation without visually looking at the apparatus by a aligning the keys of the window member and the alignment ring.

The rotary shaft position indicating and display apparatus is adapted to be used with a device having a rotatable shaft and planer mounting surface, such as a control valve. The display apparatus comprises a housing having a base with a transparent cover secured to the base and defining a hollow sealed chamber therein. An actuator shaft is journaled for rotation in the base and extends through the base into the sealed chamber. A window member having a first key is disposed within the chamber and has an opaque and an open portion. A display member is selectively coupled to the actuator shaft and includes graphics information which is viewable through openings in the window member and the transparent cover. The graphics information could comprise of words such as "open" and "closed" which is indicative of the position of the rotatable shaft of the device the apparatus is attached to. A coupling member such as a yoke is secured to the actuator shaft for coupling the actuator shaft to the rotatable shaft of the device. An alignment member is disposed within the chamber and is selectively adjustable about an axis of the actuator shaft. The alignment member has a second key adapted to couple to the first key of the window member for orienting the window member with the alignment member. By rotating the alignment member within the base, the opening of the window member is oriented with respect to the base member. While the window member and the cover are disclosed as two separate pieces, one of ordinary skill in the art will appreciate that the cover and the window member could be combined to into one piece including a cover with a window portion and keyed to be oriented with the alignment member. Hence, limitation to two separate pieces is not to be inferred.

The display apparatus further preferably includes at least one electromechanical actuating element mounted on the actuator shaft. An actuatable device, such as a proximity switch, is fastened to the base within the chamber and is responsive to at least one of the electromechanical actuating elements. These electromechanical actuating elements can be easily and quickly accessed and adjusted by removing the cover of the display apparatus. Purely electrical switches, such as optical switches, could be implemented as well.

A further improvement of the present invention includes the alignment member comprising a ring having at least one aperture preferably comprising an arcuate slot defined therethrough, wherein a first fastener is disposed through the slot to engage the base to secure the ring to the base. Thus, by loosening the fastener, the ring can be rotated within the base to re-orient the window member relative to the base.

A further improvement of the present invention includes a coupling member for securing the actuator shaft to the display member. The coupling member includes a third key wherein the display member includes a fourth key adapted to couple to the third key for orienting the actuator shaft with the display member. Thus, the display member is keyed to be adapted to the actuator shaft in only one position. Fasteners, such as screws, are used to attach the coupling member to the actuator shaft, wherein the coupling member has an upper portion shaped in a trapezoid which is received in a conforming trapezoidal shaped boss defined on an upper inner wall of the display member.

The display apparatus is preferably oriented such that the actuator shaft, the display member, the alignment member and the window member are all axially aligned with one another. Further, the cover, the window member and the display member each preferably comprise of drums, one stacked within the other.

The window member preferably includes more than one open portions extending from a side wall to a top wall with adjacent opaque sides wherein the graphics information of the display member can be viewed through each of these openings. The same indicium is observed through each opening, for example the word "open", such that the position of the shaft of a valve can be visually ascertained from more than one viewing angle. Further, the opening is observable from above and 360 degrees about the display apparatus such that there are no "blind" viewing angles.

A wire-shield drum is received within the display member and protects internal wires from being pinched or chaffed by the moving display member. Further, the wire-shield drum extends under the display drum and engages the window member such that the three pieces are removable as a unit or "cartridge". The display drum includes spring fingers for restraining rotation with respect to the window member in response to the cartridge being removed from the shaft. The cartridge arrangement allows the mechanical drums to be quickly and conveniently removed as a unit such that internal switches responsive to the actuator shaft can be accessed.

The particular orientation of each of the components as a cartridge provides for a display apparatus which is easily disassembled to access and adjust the internal cams and switches, and which can be quickly reassembled due to the keying of the components by feeling for the alignment of the keys without looking at the apparatus. This keying also prevents a person from incorrectly reassembling the display apparatus such that the window exposing the graphics information is misoriented such that the incorrect graphics is observed for a given valve position. Finally, the graphics information is viewable from above and a perspective 360 degrees about the apparatus, wherein the graphics information is not obstructed by the valve.

A cam with an internally positioned set screw allows a lobe of the cam to be precisely adjusted in the radial direction about an actuator shaft such that a corresponding sensor is responsive to the cam when the actuator shaft is in a precise position.

A further improvement of the present invention includes an electrical visual display device, such as a digital display, connected to the base of the housing and which is responsive to the position of the actuator shaft. The electrical display provides a electrical visual output which is indicative of the position of the rotatable shaft of the device the apparatus is coupled to, and further, is coordinated with the indicia viewable through the window member. The display can also comprise of one red LED which is illuminated when the valve is in the closed position, one green LED which can be illuminated when the valve is in the open position and a yellow LED which is illuminated when the valve is in a position therebetween. Further yet, the electrical display device provides a visual error signal when the device is operating in an abnormal state, such as a slow valve or a valve stuck in a particular position.

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DETAILED DESCRIPTION OF THE PREFERRED EMBODIMENT

Figure 1:
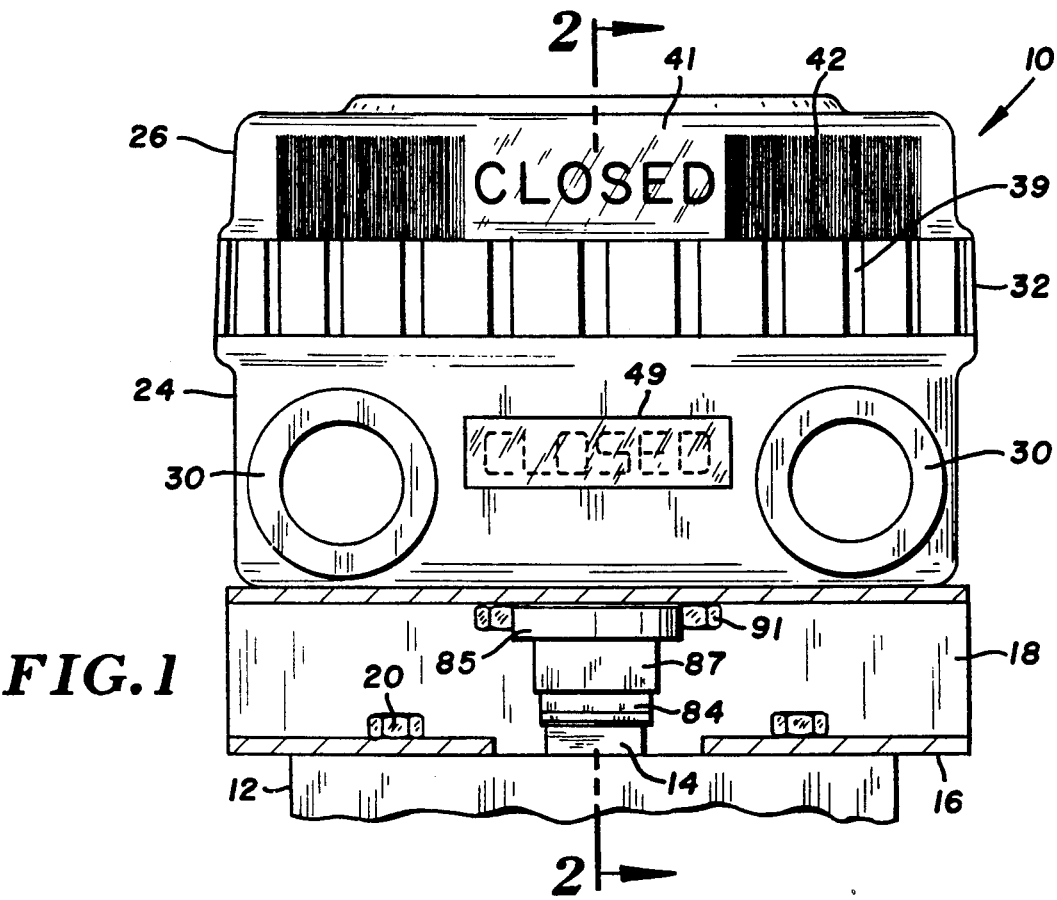
FIG. 1 illustrates a frontal view of a rotary shaft position indicating assembly according to the present invention mounted upon a valve and coupled to a rotary shaft projecting therefrom.

Referring first to FIG. 1, the preferred embodiment of the present invention is indicated generally by numeral 10 and is a rotary shaft position indicating switch assembly mounted on a valve, or a hydraulic or pneumatic valve actuator 12 having a rotary shaft 14 projecting therefrom whose position is to be telemetered to a remote location. The valve actuator 12, while generally cylindrical or irregular in shape, is provided with a planer mounting surface indicated by the numeral 16.

Figure 2:
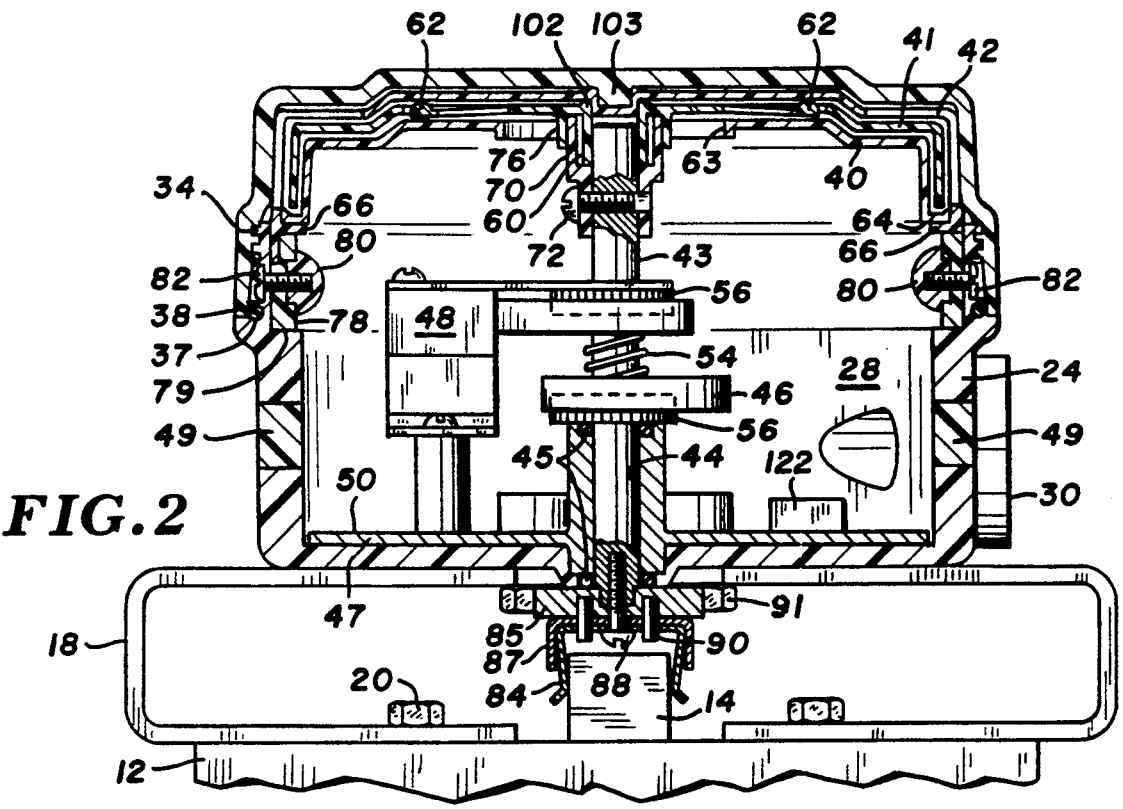
FIG. 2 shows a profile sectional view 2—2 shown in FIG. 1 illustrating the alignment of each of the components.

The rotary shaft position indicating and display assembly 10 is seen to include a C-shaped mounting bracket 18, which may be fabricated from a suitable metal or plastic material. Bracket 18 is securingly attached upon mounting surface 16 by two or more screw-type fasteners (not shown) extending through appropriately spaced holes formed in bracket 18 in combination with several bolts 20. Mounting bracket 18 extends upwardly above surface 16 and supports a housing thereabove including a cylindrically shaped base member 24, which may be molded from a suitable metal or plastic material. Assembly 10 also includes a plastic transparent circular drum-like cover 26 axially aligned with and secured to base 24 by conforming threaded portions 34 defined on each. Base 24 and cover 26 together define a hollow sealed chamber 28 (FIG. 2). Base 24 includes two threaded openings 30 extending into chamber 28, such as ½ NPT couplings for receiving a suitable fitting (not shown) on the end of an electric conduit in which wiring for internal components of assembly 10 passes. An annular recess or groove 37 defined about an upper perimeter of base 24 receives an elastic O-ring 38 to provide an air-tight seal between cover 26 and base 24 when threadably secured to each other. Cover 26 includes several vertical rectangular notches 39 (see FIG. 3) defined at uniformly spaced intervals about an outer surface to provide a grip for hands during assembly, or for receiving a tool, such as a wrench, to facilitate loosening of cover 26 from base member 24.

An inner display drum 41 includes indicia such as words or graphics defined on a surface thereof which are visible through both transparent cover 26 and an open portion or window of a cover insert drum 42. The indicia, such as the words "open" or "closed", provide a indication of the status of that particular valve 12 at any given time, as will be discussed in greater detail below. The word "open" is defined with black letters on a green background, and the word "closed" is defined with black letters on a red background. A wire-shield drum 40 is received within cover insert 42 and protects internal wiring from being pinched or chaffed by display drum 41. Display member 41, cover insert 42 and wire-shield 40 together are constrained within one another to form a cartridge assembly which is conveniently removed and replaced within the sealed chamber 28 as will be discussed shortly.

Referring to FIG. 2, a sectional profile view of assembly 10 illustrated in FIG. 1 is shown wherein an elongated actuator shaft 43 is journaled for rotation in a bore 44 which is integrally formed in a die-cast aluminum and rigid lower plate 47 of base member 24. Plate 47 is positioned upon the bottom of base 26 in chamber 28 and is sonic welded thereto. Plate 47 provides structural support for mounting assembly 10 upon bracket 18, and provides a ground path for internal wiring to shaft 43 via base 44, wherein shaft 43 is journaled for rotation in base 44 such that bushings are not necessary. Actuator shaft 43 projects upwardly through bore 44 into the chamber 28. A pair of O-rings as at 45 reside in shouldered recesses of plate 47 about shaft 43 and provide a shaft seal preventing the ingress of dust or moisture into chamber 28.

Secured to the midsection of actuator shaft 43 are one or more electromechanical actuating elements 46 which are designed to cooperate with a corresponding sensor 48, such as a proximity switch, or an analog, electronics or mechanical sensor, for producing a variable electrical signal. For example, the actuator elements 46 may be cams which are adapted to engage an actuator arm (not shown) of the corresponding proximity and snap action switches 48 mounted in a stacked relation upon a bottom inner surface 50 of plate 47. Cams 46 are secured to actuators shaft 43 such that as actuator shaft 43 rotates, different ones of the switches 48 will be actuated at different points in the rotational travel of that shaft. When sensor 48 is an analog sensor, sensor 48 provides a varying output signal proportional to the position of actuator shaft 43. Sensor 48 could also comprise an optical sensor, and thus, a variety of sensors providing an output indicative of the relative position of shaft 43 from an open to a closed position are contemplated by the present invention. Control and transmitter circuitry (see FIG. 13) is connected to and responsive to the sensors 48 and may provide a 4-20 MA or other analog signal indicative of the true position of shaft 43, and to control an electrical illuminating display 49 (see FIG. 1). Display 49 is coordinated with the mechanical display including inner drum 41 in combination with cover insert 42, wherein display 49 is ideally positioned below the transparent window of drum 41. Display 49 is ideal for ascertaining position of valve 12 in darkness, and for providing a redundant output. Display 49 also provides a visual error signal when valve 12 is operating abnormally, as will be discussed shortly.

Each cam 46 is biased away from one another by a spring 54 which is axially disposed about actuator shaft 43 between each cam. Each cam 46 has a recess adapted to receive and securingly engage a respective spline 56 which are each securingly positioned about a mid-section of shaft 43. By urging either of cams 46 away from the respective spline 56, that cam can be selectively adjusted or positioned such that the corresponding switch or sensor 48 is activated when actuator shaft 14 is at a desired angular position. Cam 46 will be discussed in greater detail shortly in reference to FIGS. 11-12.

Figure 3:
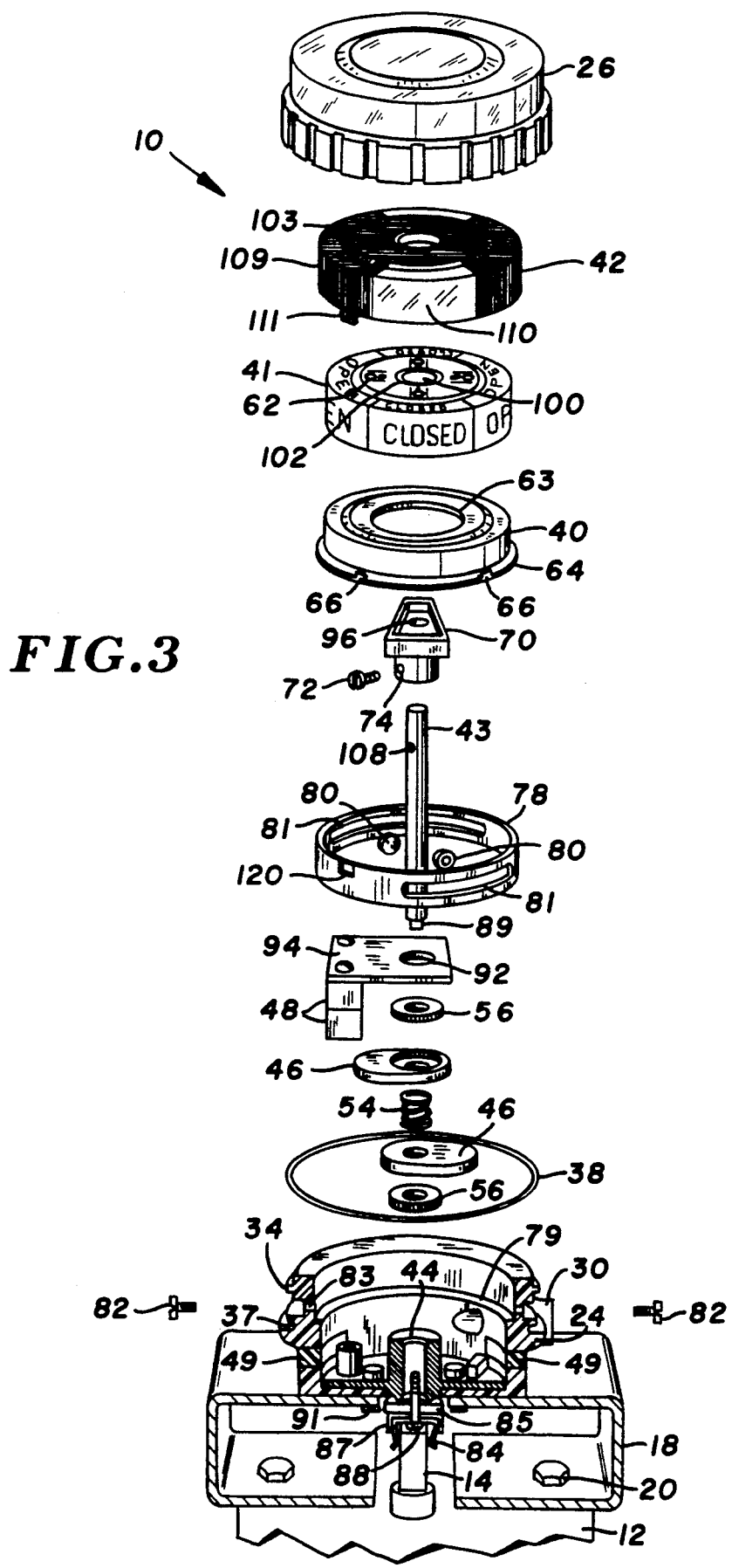
FIG. 3 illustrates an exploded perspective view of the present invention to illustrate the keying arrangement of each of the components.

Actuator shaft 43 extends upwardly into an opening defined by a centrally located first boss 60 defined on an inner upper surface of drum 41 in a friction fit manner. The cover insert 42 (FIG. 1) is axially defined about an upper portion of actuator shaft 43. Cover insert 42 is divided into four 90 degree quadrants wherein two are opaque, and the other two are openings. The opaque and open portions are alternately defined with respect to one another such that the open portions serve as windows. (FIG. 3). In an alternative embodiment, cover insert 42 could be integrated into cover 26 such that cover 26 has alternating transparent and opaque portions such that cover insert 42 is eliminated.

Still referring to FIG. 2, indicator drum 41 is also axially disposed about an upper portion of actuator shaft 43 wherein indicator or window drum 41 includes graphics information on an outside surface thereof which is visible through both cover 26 and open portions of cover insert 42. Indicator drum 41 extends closely proximate an inner surface of cover insert 42 and includes four dome shaped protrusions 62 defined on an upper outer surface as shown.

The low-profile protrusions 62 are defined on a flexible web or finger defined by a pair of openings in indicator drum such that protrusions 62 are flexible with respect to drum 42. Protrusions 62 are deflected inward toward chamber 28 slightly when assembled. Protrusions 62 ensure display drum 41 is closely proximate cover insert 42, where drum 41 contacts cover insert 42 if four equally spaced places thus providing a low friction arrangement as indicator drum 41 rotates with respect to cover insert 42. (See FIGS. 9-10). These protrusions 62 will be discussed in greater detail shortly.

Wire-shield drum 40 (see also FIGS. 7-8) comprises a plastic material and includes a central opening 63 for allowing actuator shaft 43 to pass therethrough. Wire shield 40 includes a continuous flange 64 extending outwardly from the rim, beneath and closely spaced from the rim of indicator drum 41, and engages a flared inner wall of the rim of window insert 42 in a friction fit to constrain indicator drum 41 therebetween where wire-shield 40 does not rotate with respect to cover insert 42. Wire shield 40 includes four regularly spaced protrusions 65 defined on flange 64 each having a triangularly shaped tip extending upwardly forming a recess beneath drum 41. Window insert 42 includes four irregularly spaced protrusions 66 extending inward (see FIGS. 4-6) from the rim and under flange 64 of wire shield 40 such that wire-shield drum 40 rests upon protrusions 66. Upon removing cover 26, when window insert 42 is removed, the spring action of deflected protrusions 62 each urge display drum 41 downward to engage flange 64 of wire shield 40 in the recesses formed between protrusions 65 and the side wall of wire shield 40 such that all three pieces are removed as a single unit from actuator shaft 43, referred now to as a cartridge assembly. Due to friction and the spring action of protrusions 62 which serve as a means for restricting rotation of display drum 41 when the cartridge is removed, display drum 41 does not freely rotate between wire shield 40 and cover insert 42 when the cartridge is removed from actuator shaft 43, thus keeping boss 76 and cover insert 42 aligned with one another. This dual-function cartridge assembly feature is very desirable since the three pieces can be removed and replaced as a unit without losing alignment of the members when accessing switches 48. In darkness, or when time is limited, this key feature is especially desirable. It is noted that spring fingers could be similarly designed in cover insert 42 to bias display drum 41 downward in a similar manner, and limitation to the precise method of responsively restricting rotation of display drum 41 when the cartridge is removed is not to be inferred.

A trapezoid-shaped collar drive or key member 70 (FIG. 3) is positioned about an upper portion of shaft 43 and is securingly attached thereto by one screw 72 which is received in one of threaded openings 74 (FIG. 3) defined at, for example, 90 degree spacings. As actuator shaft 43 rotates, key member 70 also rotates. Key member 70 is adapted to be received within a conforming boss 76 defined on an upper inner surface of indicator drum 41 (FIG. 9), which in turn rotates as actuator shaft 43 rotates.

An alignment ring 78 is coaxially received within base 24 and rests upon an annular shoulder 79 which is integrally formed therein. Ring 78 is selectively rotatable upon shoulder 79 and is keyed to receive and align cover insert 42 as will be discussed shortly. By selectively rotating ring 78, the openings of cover insert 42 are rotated to permit the window to be positioned such that the indicium on display drum 41 is viewable from a desired perspective. Ring 78 is selectively secured to an inner wall of base 24 by a pair of threaded fasteners 82. Fasteners 82 are each inserted through a respective conforming opening 83 defined in base 24 and through an elongated slot 81 (FIG. 3) of ring 78, and into threaded sliding nuts 80. Nuts 80 comprise of a plastic insulating material and which have recessed shoulders adapted to fit into shouldered recesses about slots 81. Nuts 80 are non-conductive to prevent a conductive path from being established from outside into chamber 28.

A U-shaped coupling member 84 is affixed to a lower end of actuator shaft 43 and a coupling spacer disc 85 and a coupling reinforcer 87 by a fastening screw 88. Screw 88 is received through coupling 84, spacer disc 85 and reinforcer 87 into a threaded counter-bore (not shown) defined in actuator shaft 43. Spacer 85 has a square recess adapted and conforming to a square protrusion 89 of shaft 43 (see FIG. 3) such that they rotate together. Coupling spacer 85 also has a pair of pins 90 protruding downward into respective openings to accept reinforcer 87 and coupling 84. The legs of the coupling 84 are arranged to straddle flats formed on the valve shaft 14 so that when the shaft 14 rotates, actuator shaft 43 rotates with it. Thus, actuator shaft 43 is securingly coupled to shaft 14. As shown, a pair of bolts 91 extend through appropriately spaced holes formed in bracket 18 into a pair of threaded counter bores defined in an outer surface of the bottom plate of body 24 such that body 24 is securingly fast upon bracket 18.

Thus, as valve shaft 14 rotates, actuator shaft 43 will cause graphics drum 41 to rotate as well such that the graphics information defined on an outer surface thereof, such as the words "open" and "closed", will be rotated behind the window defined between the open quadrants of cover insert 42. An observer can visually ascertain the position of valve 12 by observing the graphics indicia visible through the transparent cover 26. Further, the rotary shaft position indicating switch assembly 10 includes a second opening defined between the adjacent opaque quadrants opposite the first opening such that the indicia of drum 41 are also observable through the opposite side of assembly 10 and also from above. Thus, an observer can visually ascertain the valve position from more than one perspective. More than two windows can be defined about cover insert 42 such that the indicia can be observed easily 360 degrees about apparatus 10, and limitation to two windows is not to be inferred. It is particularly noted that since assembly 10 resides upon valve 12, valve 12 does not obstruct the view to the graphics information.

Now referring to FIG. 3, a detailed description of an exploded view of the preferred embodiment of the present invention will be discussed to further illustrate the coaxial arrangement of parts including graphics drum 41, cover insert 42, and cover 26, as well as the keying arrangement of each of the other parts to provide for a quick and simple assembly and disassembly.

Actuator shaft 43 is coaxially positioned in bore 44 and extends through an opening 92 defined in an alignment plate 94 extending horizontally from the uppermost one of the stacked switches 48. Actuator shaft 43 extends through a bore 96 defined through a mid-section of key member 70 and continues through an opening 63 defined in wire-drum 40, an opening 100 defined in drum 41, and finally terminates proximate a boss 103 defined on the upper inner surface of cover insert 42, as shown in FIG. 2. Alignment and lateral stabilization of actuator shaft 43 is accomplished by the close tolerances between the shaft 43 and the collar drive 70. The collar drive 70 fits closely with boss 60 of display drum 41, which in turn rotates about boss 102 of cover insert 42, which in turn has a recess conforming to a boss 103 defined on the control inner surface of cover 26. All fits are very closely toleranced, and parts that must rub against one another are compatible in the are of friction and bearing data.

Key member 70, which is seated in boss 76 defined on the inner surface of drum 41, is securingly fastened to actuator shaft 43 by one screw 72. Screw 72 extends through openings 74 defined in a lower stem portion of key member 70 and into one of corresponding openings 108 which are defined in an upper portion of actuator shaft 43. Openings 74 are defined every 90 degrees about key member 70, and openings 108 are defined every 180 degrees about actuator shaft 43, however, limitation to these spacings are not to be inferred. By loosening screw 72 such that they are removed from corresponding openings 108, key member 70 can be adjusted about actuator shaft 43 in 90 degree increments.

Figure 4:
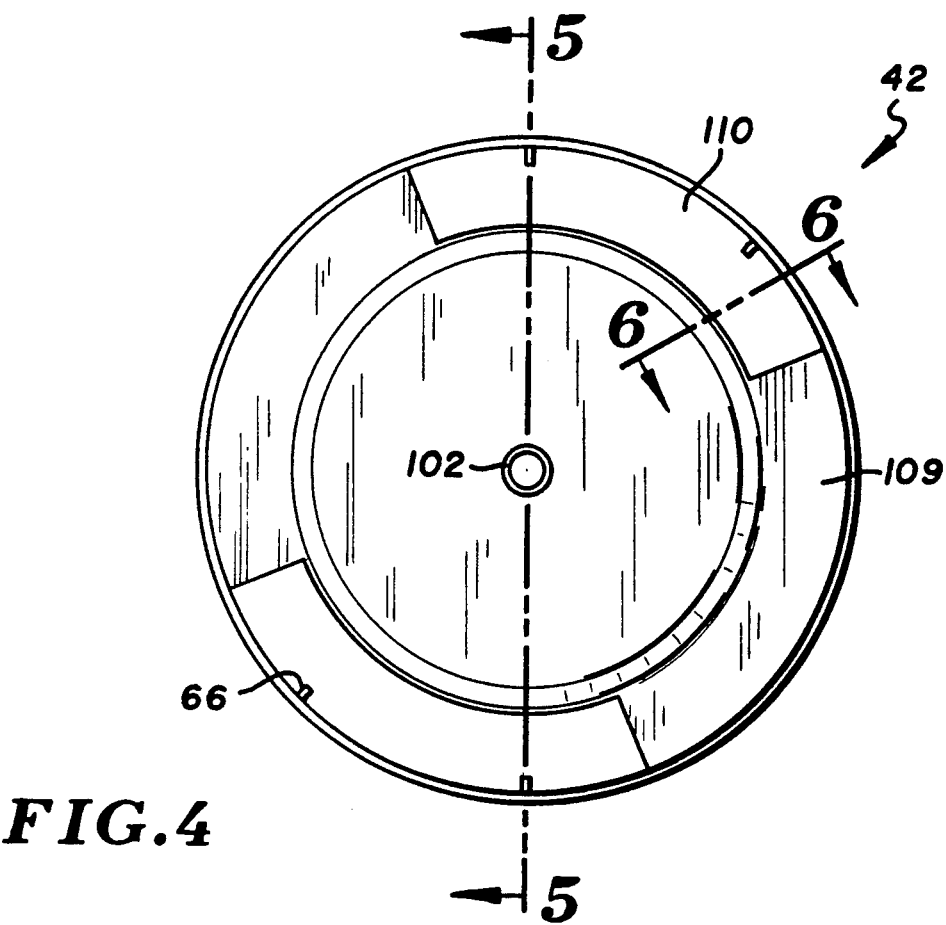
FIG. 4 illustrates a bottom view of a window member or cover insert which forms the basis of a cartridge assembly, and which is keyed to be oriented with respect to the alignment ring shown in FIG. 3.
Figure 5:
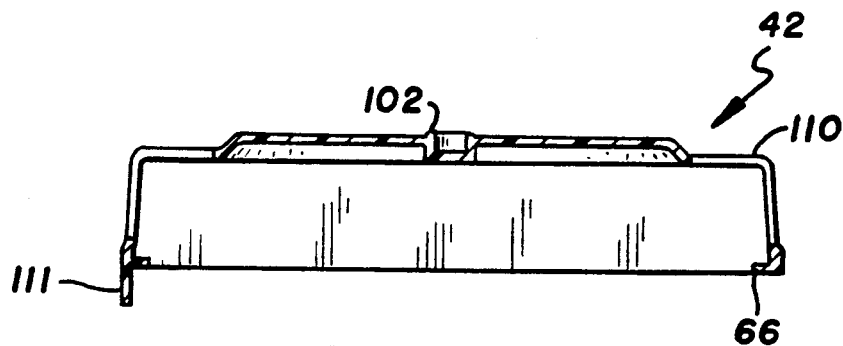
FIG. 5 is a sectional view 5—5 shown in FIG. 4.
Figure 6:
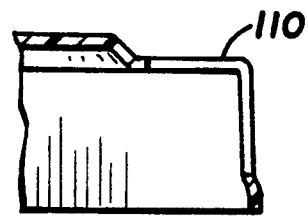
FIG. 6 is a sectional view 6—6 shown in FIG. 4.

Referring to FIGS. 4-6, cover insert 42, which may be molded of a plastic material, has an outer wall defined into four quadrants, wherein the quadrants are alternately opaque as at 109, and open as at 110. Thus, as shown, the open portions 110 serve as a window and permit the observer to view the words "open" or "closed" which are defined about drum 41. By adjusting key 70 and consequently drum 41 about shaft 43, the correct indicium which corresponds to the present position of actuator shaft 14 of valve 12 can be positioned behind open window defined in cover insert 42.

Cover insert 42 has a rectangular keying tab 111 extending downward from the rim of cover insert 42. Keying tab 111 is aligned with conforming keying recess 120 which is defined in the upper rim of alignment ring 78 (see FIG. 3). Thus, cover insert 42 is adapted to be keyed to alignment ring 78 in only one position, wherein alignment ring 78 is adapted to be received into base 24 upon shoulder 79 defined about an inner portion of base 24. Alignment ring 78 is selectably rotatable upon shoulder 79 within base 24 such that by rotating ring 78, cover insert 42 can be precisely positioned about actuator shaft 43. As shown in FIG. 3, the pair of openings 83 are defined in the inner wall of base 24 above shoulder 79 and opposite one another in the sides of base 24, and are each adapted to conform to and receive the pair of screws 82 which are inserted through the pair of corresponding elongated slots 81 which are defined along a midsection of ring 78. Slots 81 each extend approximately 120 degrees, wherein a shoulder (not shown) is defined in the inner surface of ring 78 about each slot 81 to receive the heads of each sliding nut 80. When each nut 80 is loosened, ring 78 can be rotated as previously discussed. When screw 82 is rotated clockwise, the nut 80 urges alignment ring 78 securingly toward the inner wall of base 24. Since alignment ring 78 can be rotated to any desired position, the open portion of drum 42 can be precisely positioned such that the indicia of cover insert 41 is visible from a selected perspective.

As shown, key 70 has a trapezoidal-shaped upper portion which is adapted to be received into the trapezoidal-shaped boss 76 defined on the inner surface of drum 41. Therefore, key 70 can be adapted to drum 41 in only one orientation. This feature insures that drum 41 cannot be adapted to key 70 in an incorrect orientation.

Figure 13:
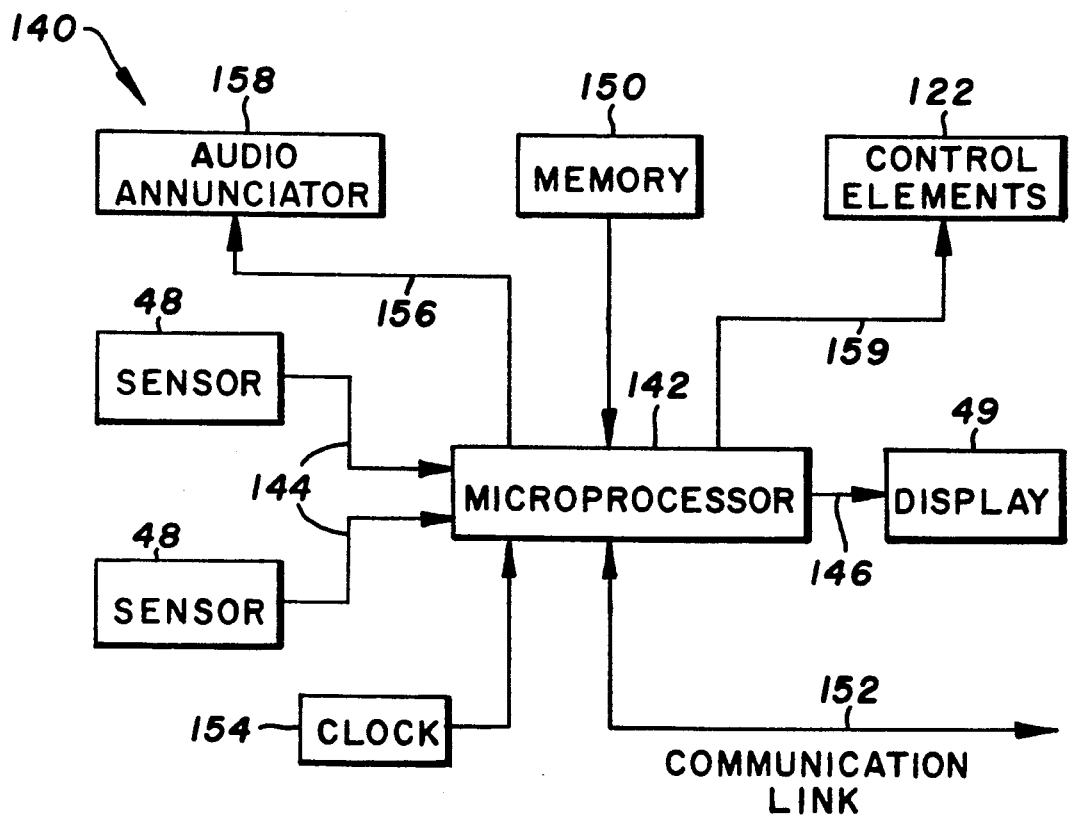
FIG. 13 illustrates a block diagram of an electronic control circuit responsive to the proximity sensors shown in FIG. 2 for generating an electronic visual output indicative of a position of the actuator shaft.

Base 24 has flats defined in the bottom plate for mounting other control elements, such as a solenoid 122 (see FIG. 2) which controls external pneumatic valve actuators. The control elements can communicate with other components external to assembly 10, and can be responsive to the control circuit (FIG. 13). A terminal block connector is securingly attached to the base plate at base 24 and provides a connector terminal for interconnecting components, such as display 49, solenoids 122 the control and transmitter circuit (FIG. 13) and switches 48 to wiring routed into chamber 28 via openings 30. All components of assembly 10 are scaled such that the need for bushings is eliminated.

Figure 7:
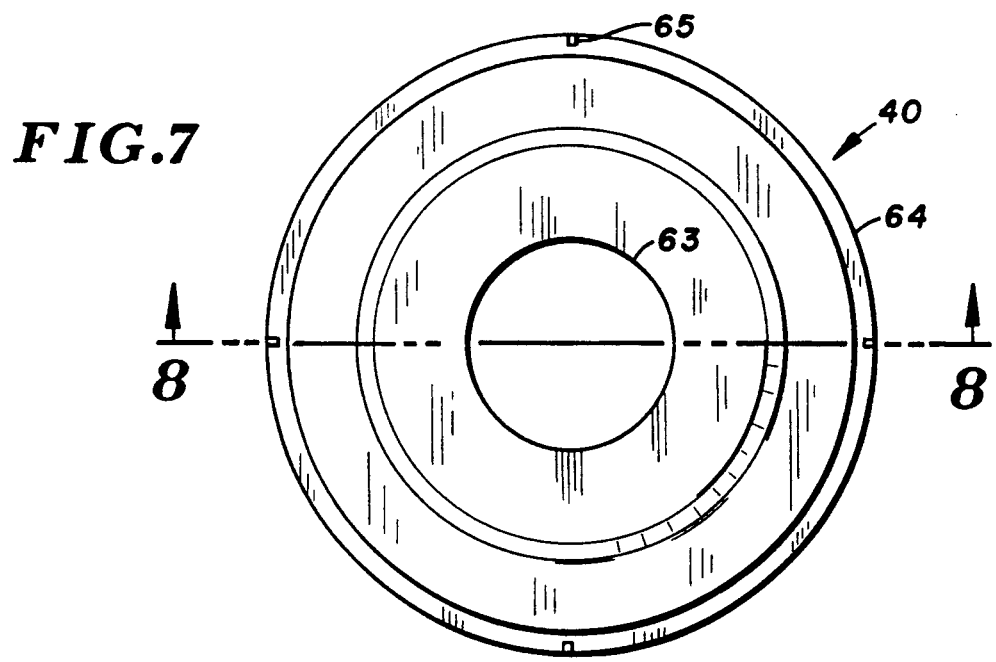
FIG. 7 is a top view of the wire-shield drum shown in FIG. 3 illustrating the four projections defined about the flange.
Figure 8:
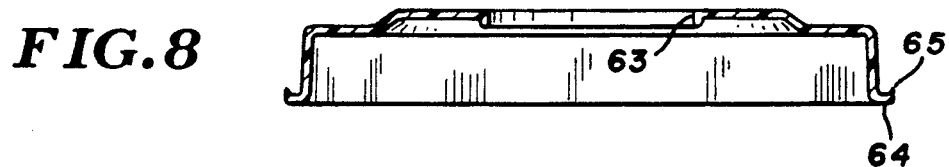
FIG. 8 is a sectional view 8—8 shown in FIG. 7.

Referring to FIGS. 7-8, a top and sectional view of wire shield drum 40 is shown. The four triangular protrusions 65 are defined equidistantly and 90 degrees from one another, and each define a recess therebetween with respect to the side wall as discussed. The top surface is contoured with a bent surface to conform the display member 41 for structural rigidity, as well as aesthetic valve.

Figure 9:
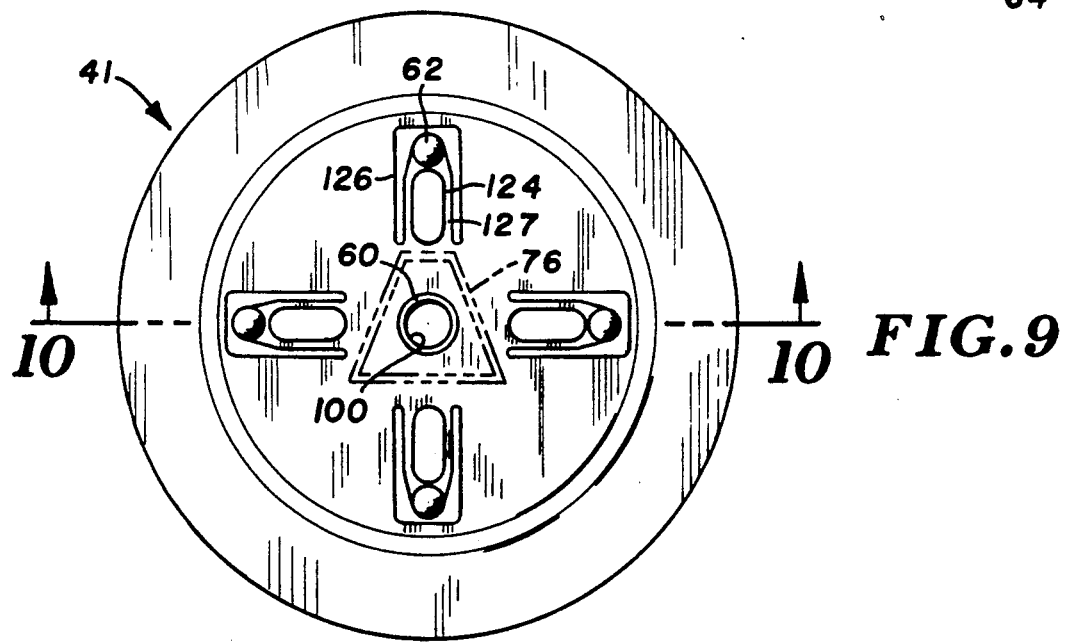
FIG. 9 is a top view of the display drum illustrating the four raised dome-shaped surfaces extending from web portions defined by a pair of elongated openings.
Figure 10:
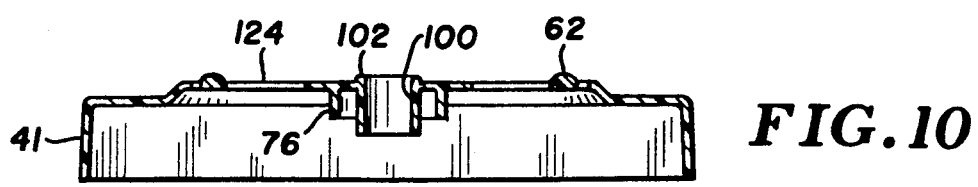
FIG. 10 is a sectional view 10—10 shown in FIG. 9.

Referring to FIGS. 9-10, a bottom and sectional view of display member 41 is shown. A first elongated opening 124 and a second U-shaped opening 126 together define a pair of web or finger portions 127 each extending from a central portion of member 41 to the dome-shaped protrusions 62. Thus, protrusions 62 are flexible and deflectable with respect to the top surface of member 41, which provides a spring action when each protrusion 62 engages the inner surface of cover insert 42. The height of protrusions 62 is only sufficient to ensure the top surface of display member 41 does not rub excessively during rotation. Since protrusions 62 and cover insert 42 are both comprised of a compatible plastic material, a low friction contact is established.

As shown in FIG. 2, cover 26 cover insert 42, display member 41 and wire shield 40 each have an upper surface contoured to conform to one another in a non-interference design. The contours provide both structural rigidity and aesthetic value.

Figure 11:
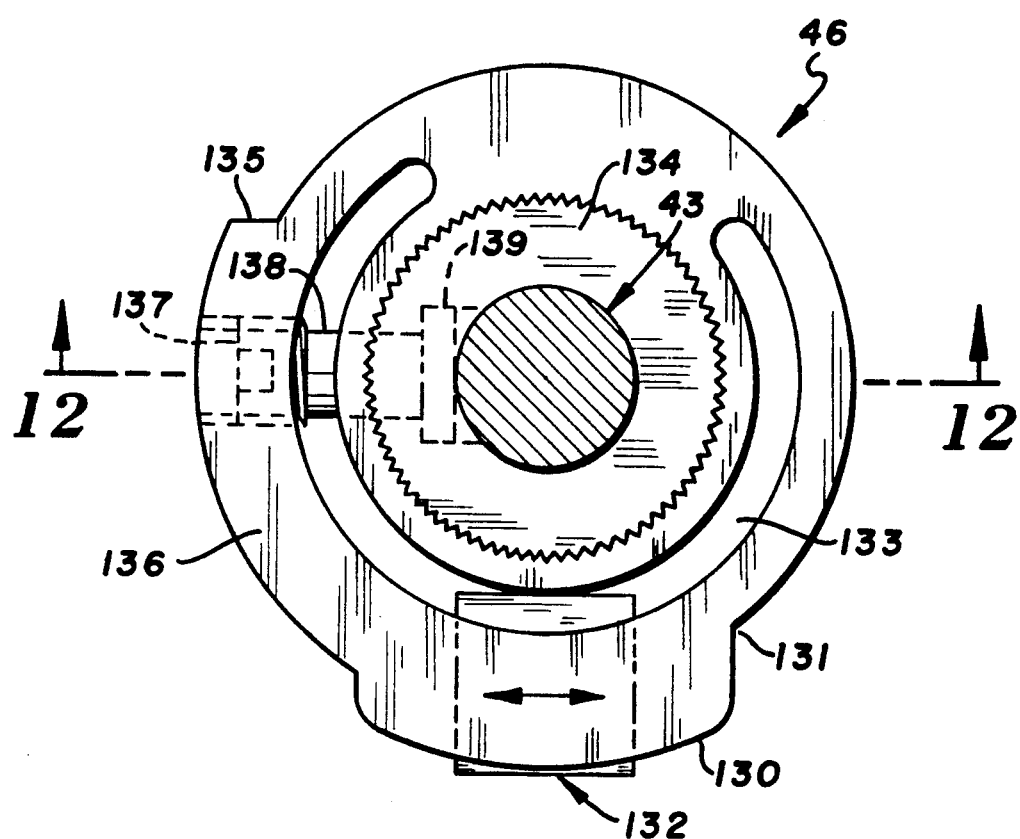
FIG. 11 is a top view of a cam illustrating a fine selection embodiment.

Referring now to FIG. 11, a top view of plastic and pliable cam 46 is shown. Cam 46 is generally circular and includes a lobe portion 130 protruding from a periphery thereof. Lobe 130 may be used to trip mechanical switches, drilled to accept one or more magnets 132 for Reeds, or to accept metal or other objects and sensed by corresponding sensor 48, as shown in FIG. 2. Cam 46 includes an elongated arcuate aperture 133 continuously extending from a top surface to a bottom surface of cam 46 defining a web portion between the periphery of cam 46. Aperture 133 extends approximately 270 degrees, but could vary between 180 to 330 degrees and is defined midway between a shouldered recess 134, which conforms to and is adapted to receive the respective spline 56, and a periphery of cam 46. Cam 46 includes a notched portion 135 defined in a perimeter thereof approximately 90 degrees from lobe 130. An arcuately shorter web portion 136 of cam 46 defined between notch 135 and lobe 130 is thicker in the radial direction than the remaining web portion defined between aperture 133 and the periphery of cam 46 such that this thicker web portion 136 is stiffer than the remaining wall portion. Defined through thicker portion 136 is a threaded bore 137 for receiving a threaded set screw 138. Set screw 138 has a head 139 abutting actuator shaft 43, an unthreaded middle portion, and a threaded portion at an opposite end threadably engaging threaded bore 137. A counterbore is axially defined in the threaded end of screw 138 having a hexagonal shape for receiving an Allen wrench or similar adjusting device. This hexagonal socket can be accessed by inserting an Allen wrench through bore 137 from a periphery of cam 46.

Figure 12:
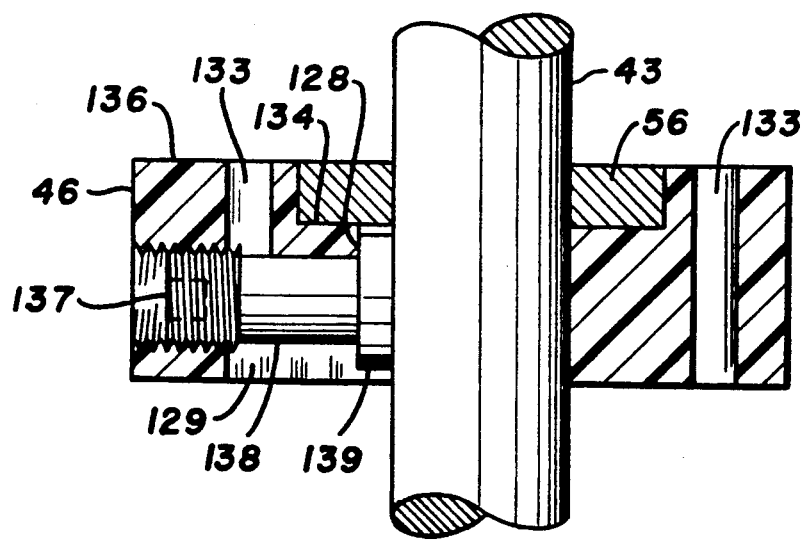
FIG. 12 is a sectional view 12—12 shown in FIG. 11.

By rotating screw 138, the thicker web portion 136 will be extended outward or inward from shaft 43, depending on the direction of rotation, since head 139 of screw 138 is leveraging against either shaft 43 or a bottom shoulder 128 defined by a recess 129 (see FIG. 12). As thicker web portion 136 is biased outward or inward from shaft 43, thicker portion 136 deflects slightly about the thinner web portion both proximate notch 135 and point 131 adjacent lobe 130. As the portion 136 extends outward, thicker portion 136 essentially forms a parallelogram such that lobe 130 is adjusted slightly in a direction tangent to actuator shaft 43 as shown. An arcuate adjustment of lobe 130 about actuator shaft 43 up to approximately 6 degrees in either direction is possible by rotating screw 138 in a corresponding direction. The serrations of spline 56 are typically separated 6 degrees in the radial direction such that cam 46 can be coarsely adjusted about shaft 43, wherein the adjustment of set screw 138 allows lobe 130 of cam 46 to be finely adjusted from 0 up to 6 degrees in either arcuate direction from the coarse adjustment. Head 139 of screw 138 is always abutting shaft 43 and shoulder 128 defined in an underside of cam 46 such that the adjustment of thicker portion 136 radially inward or outward from shaft 43 always results from the rotation of screw 138 due to threaded portions threadably engaging bore 137 as shown.

Referring to FIG. 12, a sectional view 12—12 shown in FIG. 11 is illustrated. Recess 129 is defined from the underside of cam 46 between aperture 137 and the central bore defined axially therethrough receiving actuator shaft 43. Prior to assembling cam 46 about shaft 43, set screw 138 is inserted into recess 129 and threaded into aperture 138. Subsequently, cam 46 is adapted about shaft 43 such that spline 56 is received in shouldered recess 134. Head 139 of screw 138 abuts actuator shaft 43 and shoulder 128 as shown. Once cam 46 is adapted about actuator shaft 43, set screw 138 cannot be removed from cam 46. Again, axially rotating screw 138 causes thickened portion 136 to extend radially outward or inward from actuator shaft 43 since screw 138 is leveraged against the perimeter surface of actuator shaft 43 or shoulder 128. This unique feature in combination with the coarse adjustment provided by splines 56 and shouldered recess 134 of cam 46 provides a fine tuning arrangement such that sensors 48 are responsive to cam 46 when shaft 43 is in a specific position.

A first key feature of the present invention is the arrangement of the various keying tabs and recesses, as well as the arrangement of alignment ring 78 adapted to position cover insert 42. Assembly 10 can be easily and quickly disassembled, and subsequently reassembled without requiring significant attention to the correct alignment of each of the key elements since the parts are all designed to be self-centering. Thus, cover 26 can be removed such that cover insert 42 and drum 41 can be removed so that cams 46 can be finely adjusted about actuator shaft 43 such that they actuate switches 48 when valve stem 14 is at a particular position. Subsequently, drum 41 can be quickly readapted to key member 70, and cover insert 42 can be quickly realigned with alignment ring 78 without having to visually orient the elements. The simplicity of the components, along with the capability to precisely orient the components about actuator shaft 43 within base member 24 such that the correct indicium will be read through the transparent window and will be visible from a particular perspective, is readily appreciated.

A second key feature is the arrangement of wire shield 40, display member 41 and cover insert 42 as a cartridge such that the cartridge is removable and replaceable as a single assembly.

A third key feature of this invention is the incorporation of the electronic display member 49 shown in FIG. 1. Display 49 provides two functions. First, it provides an electrical illuminating display providing a visually ascertainable output in response to sensors 48. This electrical visual output is consistent with and cooperates with the indicia of drum 41 viewable through the transparent window of drum 42. Because the display illuminates, the position of valve 12 can be ascertained in darkness. Secondly, redundancy is provided.

Second, display 49 provides a visual error signal when device 12 is operating in an abnormal state, e.g. if the valve is stuck in a position, or if valve 12 has a slow response time. The key features of display 49 will now be described in detail.

Referring to FIG. 13, a block diagram of a control and transmitter circuit 140 is shown. Circuit 140 comprises a microprocessor based circuit based around a microprocessor 142, however, it is recognized that discrete circuitry could also provide the equivalent of microprocessor 142. Microprocessor 142 is coupled to and responsive to each of sensors 48. In response to electronic signals provided on lines 144 from sensors 48, microprocessor 142 provides electronic signals via line 146 to electronic display member 49. For instance, if sensors 48 such as proximity switches indicate that valve 12 is in the closed position by sensing cams 46 on shaft 43, microprocessor 142 commands display member 49 digitally display the word "closed". If microprocessor 142 determines via an analog sensor 48 that device 12 is in a position between an open and a closed position, it will instruct display member 49 to provide a digital output indicative of the percentage that the valve 12 is open, such as "20%". Thus, display 49 provides a visual output corresponding to the relative position of device 12 from open to closed and any position therebetween, which visual output cooperates with and corresponds to the indicia viewable through the transparent window of cover insert 42.

Control circuit 140 also includes a memory circuit, such as a RAM integrated circuit or EEPROM 150. Control circuit 140 includes a communications link 152 interactively extending between microprocessor 142 and an external control or process control center (not shown). Control circuit 140 is sensed and/or controlled by the remote process control center, such as an FM or digital signal transferred over the power lines, the process which is all well known in the art. Link 152 could also comprise of an RF link, and limitation to a hardwire link is not to be inferred.

Memory 150 provides proper operating parameters of the associated device 12. For instance, memory 150 can be selectively programmed to store which positions are proper and which positions are improper for the associated device 12. If the proper positions are only open, 50%, and closed, any other positions sensed by proximity switches 48 will be determined by a microprocessor to be abnormal states, and microprocessor 142 will provide a signal via line 146 to display 49 indicative thereof. For instance, display 49 can display "error", or it may flash the display, such as flashing "40%" indicating that 40% is the relative open position of device 12, and indicating that 40% is not a proper position for the associated device 12.

Memory 150 can also be programmed to store parameters such as the proper response times for the particular device 12. For instance, when microprocessor 142 senses via proximity switches 48, or other continuous analog sensors such as a potentiometer, linear variable differential transfer (LVDT), or an encoder, that the device 12 has left a "closed position", if microprocessor 142 does not sense another proper position as stored in memory 150 within a predetermined amount of time stored in memory 150 such as 15 seconds, as sensed in-conjunction with a free running clock 154, microprocessor 142 will provide an error signal on line 146 to display 49. Microprocessor 142 can also determine based on clock 154 and the variable output of an analog sensor 48 that the rate of change over time of the output provided by sensor 48 is too slow, where again, display 49 will be instructed to display "slow", or simply flash the display. For instance, display 49 can provide a digital output "slow". Finally, if microprocessor 142 senses via sensor 48 that device 12 has held a particular position beyond a predetermined amount of time, thus indicating that the valve may be stuck, microprocessor 142 can again send an error signal via line 146 to display 49 to display the word "stuck", or to again flash display 49 thus providing a visual output that valve 12 is operating in an improper or abnormal state. Alternatively, microprocessor 142 could provide an error signal via line 156 to an audio annunciator 158 to provide an audio alarm that valve or device 12 is operating in an abnormal state. Thus, control circuit 140 provides both visual and audio error signals indicative of the operating status of device 12.

Control circuit 140 can be continuously updated and monitored via communications link 152 by a remote process control station to custom design the appropriate operating parameters of the associated device 12. The entire control circuit except for sensors 48 could also be located external to apparatus 10 for remote operation, such as on an interface circuit card proximate the process control station, and thus, limitation to control circuit 140 being defined internal to the chamber defined by base 24 and cover 26 is not to be inferred.

Microprocessor 142 can also responsively control internal or external control elements 122 via line 159 such as solenoids, which in turn control pneumatic valves. Thus, apparatus 10 can sense operating parameters of valve 14 and intelligently control other control elements in response to a position or the operating characteristics as sensed by microprocessor 42 of valve 14. For instance, microprocessor 142 can enable a solenoid 122 to open a relief valve if microprocessor 142 determines that the sensed valve 12 is operating abnormally, or normally but within a predetermined operating range as stored in memory 150. Control elements 122 can also be controlled from a main process control station via communications link 152 and microprocessor 142. This unique arrangement provides numerous design possibilities.

Control and transmitter circuit 140 in combination with display 49 can also be integrated into assembly 10 standing alone without the mechanical display feature as well. The unique display and programming functions provide operating status and error information as described which renders a totally electronic apparatus.

Figure 14:
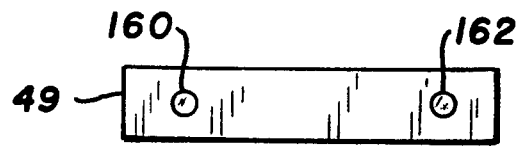
FIGS. 14–16 illustrate various alternative embodiments of the electronic visual display shown in FIG. 1.
Figure 15:
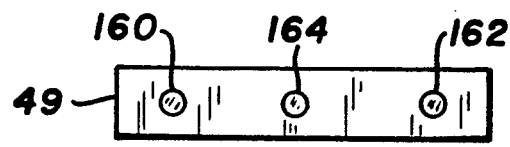
Figure 16:
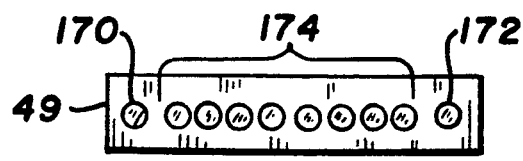

Referring to FIGS. 14-15, display 49 can also comprise a simple arrangement of two or three LEDs, wherein a first LED 160 is green, a second LED 162 is red, and a third optional LED 164 is yellow. LED 160 is illuminated when the valve is in the open position and corresponds to the green background of display drum 41 viewable through the window of cover insert 42. LED 164 is illuminated when the valve is in an intermediate position and corresponds to the red/green portions both being viewable through the window of cover insert 42. LED 162 is illuminated when the valve is in a closed position and corresponds to the red background of display drum 41 viewable through the window of cover insert 42. Referring to FIG. 16, display 49 can comprise of an analog or linear display, such as ten LEDs. A first green LED 170 and a second red LED 172 are positioned on opposite ends, wherein eight yellow LEDs 174 are linearly positioned therebetween. Each LED can correspond to a discrete interval such as 10%, wherein if the valve is 40% opened, LED 170 is illuminated and the first three adjacent yellow LEDs are illuminated as well. FIG. 15 actually is a hybrid digital/analog display. If an error signal is determined, any predetermined number or arrangement of the LEDs shown in FIGS. 14-16 can be flashed, or all LEDs can be flashed to indicate an error status of device 12.

In summary, display 49 provides an electronic visual output indicative of the actual position of the rotary shaft of device 12, wherein the illuminated output corresponds to and has the same color as the indicia of drum 41 viewable through the transparent window of cover insert 42. Secondly, display 49 provides illuminated error signals thus indicating the operating status of valve 12. If valve 12 is determined to be operating in an abnormal state, various error signals can be provided. Digital display 49 can comprise of an LED or LCD display, and the display can be displayed in a color corresponding to the operating status of device 12 shown by the indicia of drum 41 through the openings of cover insert 42. For instance, the digitally displayed word "closed" can be displayed in red, wherein the digital representation "open" can be displayed in green. Any other intermediate position, such as 20, 30 or 40%, can be diplayed in yellow. An error signal could be displayed in blue. Thus, the operating status of device 12 is coordinated by color as well.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications, both as to equipment details and operating procedures, can be accomplished without departing from the scope of the invention itself.

I claim:

1. Rotary shaft position indicating and display apparatus for use with a device having a rotatable shaft and a planar mounting surface, comprising:
   (a) a housing having a base with a transparent cover secured to said base and defining a hollow chamber;
   (b) an actuator shaft journaled for rotation in said base and extending through said base into said hollow chamber;
   (c) a window member disposed within said chamber having both an opaque portion and an open portion, wherein said window member has a first keying means;
   (d) a display member selectively coupled to said actuator shaft and including graphics information viewable through said open portion of said window member and said cover;
   (e) coupling means secured to said actuator shaft for coupling said actuator shaft to said rotatable shaft of said device; and
   (f) an alignment member disposed within said chamber and selectively adjustable about an axis of said actuator shaft, said alignment member having a second keying means adapted to couple to said first keying means of said window member for orienting said window member with said alignment member.

2. The display apparatus as specified in claim 1 further comprising:
   (a) at least one electromechanical actuating element mounted on said actuator shaft; and
   (b) means coupled to said base within said chamber for actuation by at least one said electromechanical actuating element.

3. The display apparatus as specified in claim 1 wherein said alignment member comprises a ring axially disposed about said actuator shaft, and further including a first fastening means for selectively securing said ring to said base.

4. The display apparatus as specified in claim 3 wherein said ring includes at least one aperture and said first fastening means is disposed through said aperture to engage said base.

5. The display apparatus as specified in claim 1 further including an electrical visual display means coupled to said base of said housing and responsive to a position of said actuator shaft such that said display means provides a visual output corresponding to the graphics information viewable through said open portion of said window member.

6. The display apparatus as specified in claim 5 further comprising control means within said chamber responsive to a position of said actuation shaft for controlling an external device.

7. The display apparatus as specified in claim 6 wherein said control means comprises a solenoid.

8. The display apparatus as specified in claim 5 wherein said display means comprises a digital display.

9. The display apparatus as specified in claim 1 further comprising a coupling member for securing said actuator shaft to said display member and having a third keying means, wherein said display member includes a fourth keying means adapted to couple to said third keying means of said coupling member for orienting said actuator shaft with said display member.

10. The display apparatus as specified in claim 1 wherein said actuator shaft, said display member, said alignment member and said window member are all axially aligned with one another.

11. The display apparatus as specified in claim 10 wherein said cover, said window member and said display member each comprise of drums.

12. Rotary shaft position indicating and display apparatus for use with a device having a rotatable shaft and a planar mounting surface, comprising:
(a) a housing having a base with a transparent cover secured to said base and defining a hollow chamber;
(b) an actuator shaft journaled for rotation in said base and extending through said base into said chamber;
(c) a window member disposed within said chamber having both an opaque portion and an open portion;
(d) a display member selectively coupled to said actuator shaft and including graphics information viewable through said open portion of said window member and said cover;
(e) coupling means secured to said actuator shaft for coupling said actuator shaft to said rotatable shaft of said device; and
(f) electronic means responsive to a relative position of said actuator shaft for electronically providing a visual output indicative of a relative position of said rotatable shaft, wherein said visual output is indicative of whether said rotatable shaft is in a first position, a second position, or a position therebetween relative to said first position.

13. The display apparatus as specified in claim 12 wherein said electronic means further provides an error signal when said device is operating in an abnormal condition.

14. The display apparatus as specified in claim 13 wherein said error signal comprises a visually ascertainable signal.

15. The display apparatus as specified in claim 14 wherein said error signal comprises flashing said visual output.

16. The display apparatus as specified in claim 14 wherein said error signal comprises a color corresponding to a operating state of said device.

17. The display apparatus as specified in claim 13 wherein said error signal comprises on audio signal.

18. The display apparatus as specified in claim 12 wherein said window member includes a first keying means, said apparatus further comprising an alignment member disposed within said chamber and selectively adjustable about an axis of said actuator shaft, said alignment member having a second keying means adapted to couple to said first keying means of said window member for orienting said window member with said alignment member.

19. The display apparatus as specified in claim 12 wherein said electronic means comprises a digital display.

20. The display apparatus as specified in claim 12 wherein said visual output comprises an analog display.

21. The display apparatus as specified in claim 12 further comprising memory means coupled to said electronic means for storing a set of operating parameters of said device for use by said electronic means.

22. The display apparatus as specified in claim 12 wherein said electronic means includes communicating means for communicating with a remote processing device.

23. The display apparatus as specified in claim 10 further comprising control means within said chamber responsive to said electronic means for controlling an external device.

24. The display apparatus as specified in claim 22 wherein said control means comprises a solenoid.

25. Rotary shaft position indicating and display apparatus for use with a device having a rotatable shaft and a planar mounting surface, comprising:
(a) a housing having a base with a transparent cover secured to said base and defining a hollow chamber;
(b) an actuator shaft journaled for rotation in said base and extending through said base into said chamber;
(c) a window member disposed within said chamber having both an opaque portion and an open portion;
(d) a display member selectively coupled to said actuator shaft and having a first portion having a first color and a second portion having a second color, said first and second portions being viewable through said open portion of said window member and said cover;
(e) coupling means secured to said actuator shaft for coupling said actuator shaft to said rotatable shaft of said device; and
(f) electronic means responsive to a position of said actuator shaft for electronically providing a visual output indicative of a position of said rotatable shaft, wherein said visual output comprises the same first or second color of the corresponding first or second portion viewable through said open portion of said window member.

26. The display apparatus as specified in claim 25 wherein said visual output comprises a third color when both said first and second portions are viewable through said open portion of said window member.

27. Rotary shaft position indicating and display apparatus for use with a device having a rotatable shaft and a planar mounting surface, comprising:
(a) a housing having a base with a transparent cover secured to said base and defining a hollow chamber;
(b) an actuator shaft journaled for rotation in said base and extending through said base into said chamber;
(c) coupling means secured to said actuator shaft for coupling said actuator shaft to said rotatable shaft of said device; and
(d) cartridge means selectively coupled to said actuator shaft in said chamber comprising a window member having both an opaque portion and an open portion, said cartridge means further comprising a display member selectively coupled to said actuator shaft and including graphics information viewable through said open portion of said window member, said cartridge means further comprising means for constraining said display member with respect to said window member such that both said display and said window member are together removable as a unit.

28. The display apparatus as specified in claim 27 wherein said means for constraining comprises a wire guard disposed within said chamber for protecting other components within said chamber from contact with said display member.

29. The display apparatus as specified in claim 28 wherein said wire guard is selectively constrained with respect to said window member such that said display member is movable therebetween.

30. The display apparatus as specified in claim 28 wherein each said display member, said window member and said wire guard comprise of drums each concentrically aligned with one another.

31. The display apparatus as specified in claim 27 further comprising means for restricting rotation of said display member relative to said window member when said cartridge means is removed from said actuator shaft.

32. The display apparatus as specified in claim 31 wherein said restricting means comprises spring means coupled to said display member.

33. The display apparatus as specified in claim 32 wherein said spring means comprises spring fingers integrally defined in said display member.

34. The display apparatus as specified in claim 33 wherein said spring fingers leverage against said window member to urge said display member toward said wire guard means.

35. Rotary shaft position indicating and display apparatus for use with a device having a rotatable shaft and a planar mounting surface, comprising:
(a) a housing having a base with a transparent cover secured to said base and defining a hollow chamber;
(b) an actuator shaft journaled for rotation in said base and extending through said base into said chamber;
(c) coupling means secured to said actuator shaft for coupling said actuator shaft to said rotatable shaft of said device;
(d) actuation means disposed within said chamber; and
(e) an actuating element mounted on said actuator shaft for actuating said actuation means and having an adjustment means disposed therein for precisely positioning said actuating element in an arcuate direction.

36. The display apparatus as specified in claim 35 wherein said actuating element comprises a cam having a periphery and wherein said adjustment means comprises a set screw for selectively offsetting said periphery in response to rotating said set screw.

37. The display apparatus as specified in claim 36 wherein said cam has an elongated aperture defined between an inner portion thereof and said periphery, wherein said set screw extends in a radial direction across said aperture and abuts said actuator shaft such that rotating said set screw in a first direction urges said periphery of said cam proximate said set screw away from said actuator shaft.

38. The display apparatus as specified in claim 37 wherein said set screw abuts a shouldered recess defined in said cam such that rotating said set screw in a second direction urges said periphery of said cam proximate said set screw toward said actuator shaft.

* * * * *